(12) United States Patent
Deppe et al.

(10) Patent No.: US 7,954,842 B2
(45) Date of Patent: Jun. 7, 2011

(54) AIRBAG RESTRAINT DEVICE FOR OCCUPANTS OF A VEHICLE

(75) Inventors: Rüdiger Deppe, Lenting (DE); Christian Hans Georg Determann, Wettstetten (DE); Stefan Gottauf, Ingolstadt (DE); Stefan Krug, Merseburg (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 12/695,215

(22) Filed: Jan. 28, 2010

(65) Prior Publication Data

US 2010/0187798 A1    Jul. 29, 2010

(30) Foreign Application Priority Data

Jan. 28, 2009    (DE) .................. 10 2009 006 502

(51) Int. Cl.
*B60R 21/16* (2006.01)
(52) U.S. Cl. ................... 280/728.3; 280/730.2
(58) Field of Classification Search .............. 280/728.3, 280/730.2
See application file for complete search history.

(56) References Cited

U.S. PATENT DOCUMENTS

| | | | |
|---|---|---|---|
| 6,045,151 A | 4/2000 | Wu | |
| 6,588,838 B1 * | 7/2003 | Dick et al. | 297/216.13 |
| 7,334,811 B2 * | 2/2008 | Tracht et al. | 280/728.3 |
| 7,401,806 B2 * | 7/2008 | Tracht | 280/730.2 |
| 7,637,529 B2 * | 12/2009 | Tracht | 280/728.3 |
| 7,695,064 B2 * | 4/2010 | Thomas et al. | 297/216.16 |
| 7,784,819 B2 * | 8/2010 | Lawall et al. | 280/728.3 |
| 7,789,419 B2 * | 9/2010 | Smith | 280/730.2 |
| 2006/0113766 A1 * | 6/2006 | Tracht et al. | 280/730.2 |
| 2006/0113771 A1 * | 6/2006 | Tracht | 280/730.2 |
| 2006/0113773 A1 * | 6/2006 | Tracht | 280/730.2 |
| 2007/0187933 A1 * | 8/2007 | Tracht et al. | 280/730.2 |
| 2007/0222191 A1 * | 9/2007 | Tracht | 280/730.2 |
| 2008/0073952 A1 | 3/2008 | Tracht et al. | |

FOREIGN PATENT DOCUMENTS

| | | |
|---|---|---|
| DE | 20320012 | 3/2004 |
| DE | 102007050274 | 1/2009 |
| JP | 2008-114637 | 5/2008 |
| WO | WO 2008/095485 | 8/2008 |

* cited by examiner

*Primary Examiner* — Toan C To
(74) *Attorney, Agent, or Firm* — Robert W. Becker; Robert W. Becker & Assoc

(57) ABSTRACT

An airbag restraint device for occupants of a vehicle, and including an airbag system having an airbag module with an inflatable airbag. A cover at least partially covers the airbag and has a tear seam via which the airbag, upon inflation, can expand outwardly. A force-concentrating arrangement concentrates the opening force of the expanding airbag onto the tear seam, and comprises a structure extending around the airbag and having two opposite ends. The structure is folded over to form two layers and to bring the ends together at the tear seam, where the ends are connected to the cover. One of the ends is provided with a plurality of spaced-apart, strip-shaped members extending away from that end and sewn directly to the tear seam to form tear strips that upon expansion of the airbag tear defined, spaced-apart holes into the tear seam for a defined further opening thereof. The layers of the structure are disposed next to or parallel to one another.

12 Claims, 2 Drawing Sheets

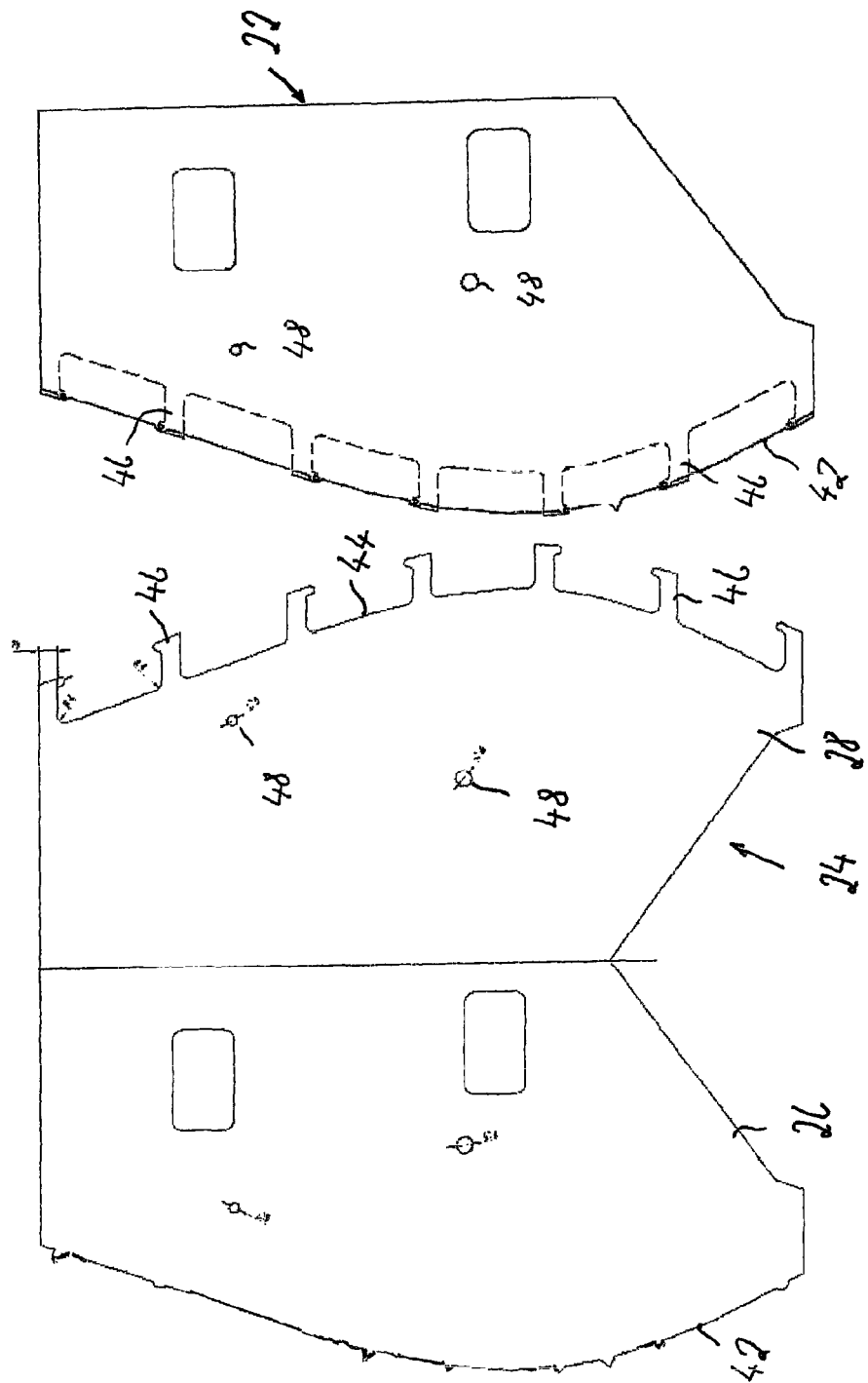

US 7,954,842 B2

AIRBAG RESTRAINT DEVICE FOR OCCUPANTS OF A VEHICLE

The instant application should be granted the priority date of Jan. 28, 2009, the filing date of the corresponding German patent application 10 2009 006 502.4.

BACKGROUND OF THE INVENTION

The present invention relates to a restraint device for occupants of a vehicle, and includes an airbag system.

It is known to accommodate airbag systems behind a protective covering, such as a dashboard cladding, door coverings, seat coverings, and the like, wherein upon deployment of the airbag the covering tears open in order to allow the airbag to pass through. In this connection, the covering must not significantly obstruct the escape of the airbag. It is still frequent practice to utilize the force of the inflating airbag in order to tear open the covering along a line of weakness, such as a tear seam or a tear filament. In this connection, the strength of the tear seam, the quality of the material, and the stretchability of the material influence the unfolding of an airbag accommodated in this fashion with great tolerance and time lag, for example from a seat back. The lines or regions of weakness can, however, not be made as weak as desired, since then the danger would exist that the covering would already open during normal intended use. Therefore, a considerable portion of the force of the inflating airbag, and the time for the opening of the covering, must be utilized, which counteracts the provision of the protective function.

It is has therefore already been proposed in U.S. Pat. No. 6,045,151 to provide the airbag system with a force concentrator for concentrating the force of the inflating or unfolding airbag onto the tear seam. This known force concentrator includes two panels of sheet material that are wound about the airbag module and that have two opposite ends that are brought together on opposite sides of the tear seam and are connected with a cover that extends over the airbag module. It is not possible to introduce the force of the airbag in a defined manner, in particular to specific locations of the tear seam.

WO 2008 095485 furthermore discloses tear strips provided on one side of a fabric section for a sleeve that surrounds the airbag; on the opposite side, the tear strips are inserted through holes or slots, and are then sewn to the tear seam. Providing insertion holes for the strips increases the manufacturing and assembly cost and effort, and reduces the opening force of the airbag.

It is an object of the present invention to provide a restraint device of the aforementioned general type that simplifies manufacture and assembly of the airbag system, and directs the expanding or unfolding airbag in a more effective and defined manner onto the tear seam.

BRIEF DESCRIPTION OF THE DRAWINGS

This object, and other objects and advantages of the present invention, will appear more clearly from the following specification in conjunction with the accompanying schematic drawings, in which:

FIG. 3: is a plan view onto a sheet-like cut out piece of fabric for the force-concentrating arrangement, and FIG. 4: shows the sheet-like piece of fabric of FIG. 3 in the joined-together state.

SUMMARY OF THE INVENTION

Figures 1, 2:
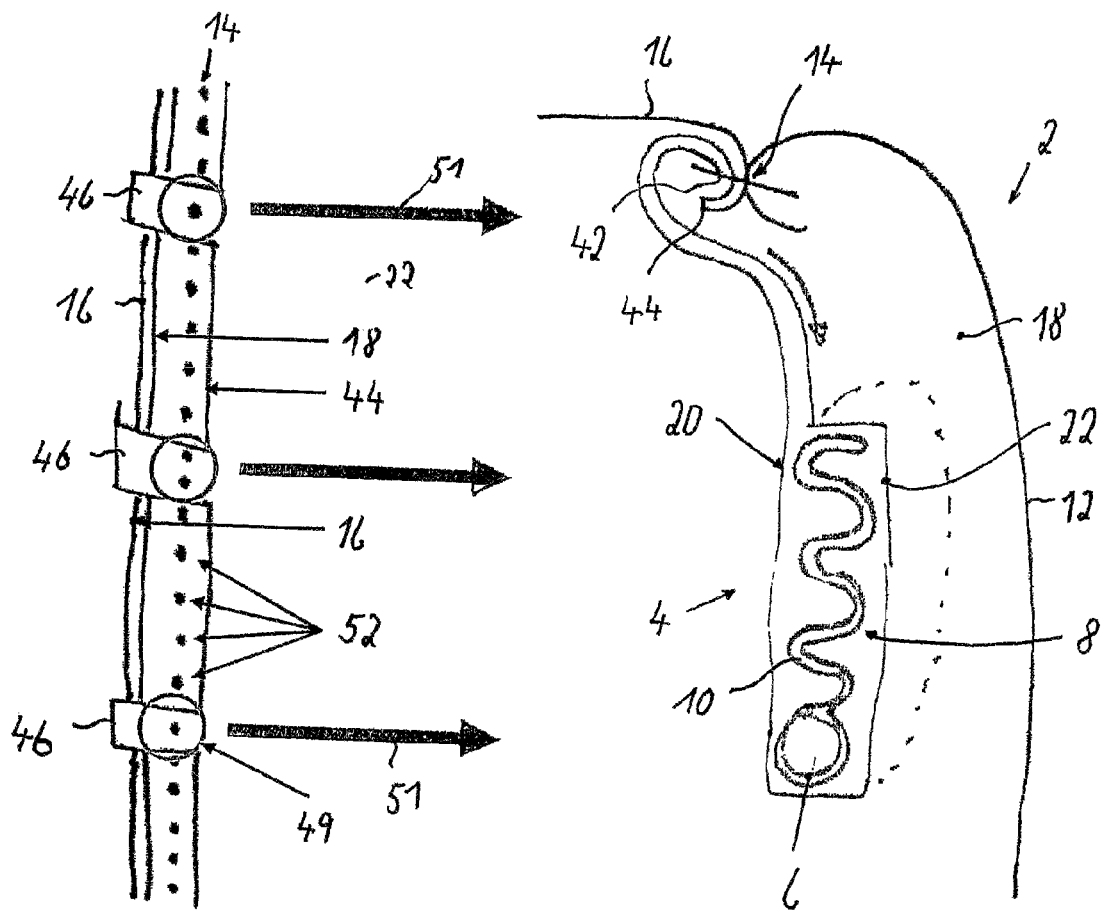
FIG. 1 is a side view onto a portion of one exemplary embodiment of the inventive airbag restraint device.
FIG. 2 is a cross-sectional view through a tear seam with the force-concentrating arrangement mounted thereon.

The airbag restraint device of the present application comprises an airbag system having an airbag module that includes an airbag inflatable by an inflation device; a cover that at least partially covers the airbag and that is provided with a tear seam for the airbag via which the airbag, upon inflation, can expand outwardly; and a force-concentrating arrangement for concentrating the opening force of the airbag, as it expands, onto the tear seam, wherein the force-concentrating arrangement comprises a structure that extends around the airbag and has two opposite ends, the structure being folded over to form two layers and to bring the two ends together at the tear seam, wherein the ends are connected to the cover, wherein one of the ends of the structure is provided with a plurality of spaced-apart, strip-shaped members that extend away from the one end and are sewn directly to the tear seam and form tear strips that upon expansion of the airbag tear defined, spaced-apart holes into the tear seam, from which the tear seam is further opened in a defined manner, the layers of the structure being disposed next to or parallel to one another.

An important feature of the solution of the present invention is that the force-concentrating arrangement is formed with a plurality of spaced-apart tear strips that are connected directly with the covering on one side of the tear seam, and via which the opening force can be introduced in a defined and pointwise manner onto one seam stitch or only a few seam stitches, for example two seam stitches. By eliminating insertion slots or holes, the configuration of the force-concentrating arrangement is simplified. Due to the concentrated introduction of the opening force, it is possible to utilize stronger tear seams, thereby reducing the danger of an undesired splitting open of a weakened tear seam. The tearing open or pulling apart position can be precisely prescribed. The airbag restraint device of the present application provides a single-piece concept, according to which it is unnecessary to sew together two halves of a sack, as a result of which costs can be saved and a potential weak point is eliminated. It is possible to realize a self-contained unit, independently of the respective cover. The inventive configuration simplifies assembly.

Further specific features of the present invention will be described in detail subsequently.

DESCRIPTION OF SPECIFIC EMBODIMENTS

Referring now to the drawings in detail, the same or corresponding components are provided with the same reference numerals in the figures of the drawings.

FIG. 1 schematically shows a restraint system 2 for occupants of a vehicle, and includes an airbag system 4, which is provided with an airbag module 8 having an airbag 10 that is inflatable via an inflation device 6.

The airbag 10 is at least partially covered by a cover 12 on the airbag side; the cover 12 is connected with a cover 16 on the occupant side by means of a tear seam 14.

The airbag system 4 is additionally covered by a foam insert 18.

In the normal or starting position, the airbag 10 can be folded, as is illustrated in FIG. 1.

The airbag system 4 is provided with a force-concentrating device or arrangement 20, which in the illustrated embodiment is comprised of a bag or sack-like structure 22 comprised of a cut out piece of fabric 24 that is not stretchable, or is only very slightly stretchable, and that has two halves 26, 28 that can be folded over one another (see FIGS. 3 and 4). The piece of fabric 24 extends around the airbag module 8 in a sack-like or sleeve-like manner, and two opposed ends 42, 44 of the piece of fabric 24 are guided to the tear seam 14 and are connected with the cover 16, whereby the two layers of the piece of fabric 24 that lead to the ends 42, 44 are disposed so as to extend next to or parallel to one another.

One end of the piece of fabric 24, the end 44 in the drawings, is cut out such that a plurality of spaced-apart, strip-shaped members 46 are formed that extend away from the end 44 and via which the sack-like structure 22 is sewn to one side of the tear seam 14. The length, width as well as the number and the spacing of the strip-shaped members 46 from one another, can be selected, whereby in particular the width and the spacing are to be selected such that the strip-shaped members are in operative connection with one or at most two tear seam stitches. This ensures that when the airbag 10 expands, the strip-shaped members 46 tear a plurality of spaced-apart holes into the tear seam 14 in a defined stitch wise manner, from which the entire tear seam can be torn apart with relatively little opening force, since the tear-open work per strip-shaped member needs to be carried out only from hole to hole.

The piece of fabric 24 used for the sack-like structure 22 is illustrated in plan in FIG. 3. The reference numerals 48 designate holes for non-illustrated fastening screws for the airbag module 8.

FIG. 2 shows a schematic sectional view through the tear seam 14. The reference numeral 44 here indicates the one end of the piece of fabric 24 having the strip-shaped members 46 formed thereon, with only three of the members being illustrated. These strip-shaped members 46 are connected with the cover 16, as schematically illustrated in FIG. 2. The reference numerals 52 designate the seam stitches of the tear seam 14. When the airbag 10 is activated and deployed, it is inflated via the inflation device 6 and unfolds and expands.

FIG. 2 clearly shows that with the force effect of the airbag 10 via the force-concentrating device 20, the strip-shaped members 46 transfer the opening force of the airbag 10 to one, or at the most two, seam stitches 52 of the tear seam 14, as a result of which holes are torn in the tear seam filaments and the cover 16 (see the reference numeral 49), from where the tear seam 14 is entirely torn open in an unraveling or run-like manner to release the expanding airbag 10. The arrows 51 show the direction of force.

The airbag 10 together with the inflation device 6 can additionally be encased by a non-illustrated protective device that tears open when the airbag unfolds without obstructing the unfolding of the airbag.

The specification incorporates by reference the disclosure of German priority document 10 2009 006 502.4 filed Jan. 28, 2009.

The present invention is, of course, in no way restricted to the specific disclosure of the specification and drawings, but also encompasses any modifications within the scope of the appended claims.

What we claim is:

1. An airbag restraint device for occupants of a vehicle, comprising:
   an airbag system having an airbag module that includes an airbag that is inflatable via an inflation device;
   a cover that at least partially covers said airbag, wherein said cover is provided with a tear seam that is designed for said airbag and via which said airbag, upon inflation, can expand outwardly; and
   a force-concentrating arrangement for concentrating an opening force of said airbag, as it expands, onto said tear seam, wherein said force-concentrating arrangement comprises a structure (that extends around said airbag and has two opposite ends, further wherein said structure is folded over to form two layers and to bring said ends together at said tear seam, where said ends are connected to said cover, further wherein one of said ends of said structure is provided with a plurality of spaced-apart, strip-shaped members that extend away from said one end, further wherein said strip-shaped members are sewn directly to said tear seam and form tear strips that upon expansion of said airbag are adapted to tear defined, spaced-apart holes into said tear seam for a defined further opening of said tear seam, and wherein said layers of said structure are disposed next to or parallel to one another.

2. An airbag restraint device according to claim 1, wherein said one end of said structure is cut out to form said spaced-apart, strip-shaped members.

3. An airbag restraint device according to claim 1, wherein said strip-shaped members are sewn to one side of said tear seam.

4. An airbag restraint device according to claim 1, wherein the length, width, and number and spacing of said strip-shaped members from one another, are selectable.

5. An airbag restraint device according to claim 1, wherein the width of said strip-shaped members is selectable such that said strip-shaped members are in operative connection with a pre-determinable number of tear seam stitches.

6. An airbag restraint device according to claim 5, wherein said strip-shaped members are in operative connection with one or two tear seam stitches.

7. An airbag restraint device according to claim 1, wherein the spacing between said strip-shaped members is selectable such that a pre-determinable number of tear seam stitches remain between sewn-on members.

8. An airbag restraint device according to claim 1, wherein a foam insert is provided, and wherein said airbag system is disposed below said foam insert.

9. An airbag restraint device according to claim 1, wherein in a mounted and non-inflated starting position, said airbag is folded.

10. An airbag restraint device according to claim 1, wherein said structure that extends around said airbag is in the form of a sack, a casing or a sleeve.

11. An airbag restraint device according to claim 1, wherein said structure that extends around said airbag is comprised of a piece of fabric that is not stretchable or is only very slightly stretchable.

12. An airbag restraint device according to claim 1, which includes a protective device that encases said airbag and said inflation device, and wherein upon unfolding of said airbag said protective device tears open without obstructing the unfolding of said airbag.

\* \* \* \* \*